June 7, 1955  E. J. SCHWARTZ  2,710,105
VEHICLE BODY FOR HANDLING AND TRANSPORTING PALLETIZED CARGO
Filed Aug. 29, 1950  6 Sheets-Sheet 1

Inventor
Eugene J. Schwartz
By Soans, Xausler & Anderson
Attorneys

June 7, 1955      E. J. SCHWARTZ      2,710,105
VEHICLE BODY FOR HANDLING AND TRANSPORTING PALLETIZED CARGO
Filed Aug. 29, 1950      6 Sheets-Sheet 2

June 7, 1955     E. J. SCHWARTZ     2,710,105

VEHICLE BODY FOR HANDLING AND TRANSPORTING PALLETIZED CARGO

Filed Aug. 29, 1950     6 Sheets-Sheet 5

Inventor
Eugene J. Schwartz
By Soans, Gleister & Anderson
Attorneys

United States Patent Office 2,710,105
Patented June 7, 1955

2,710,105
VEHICLE BODY FOR HANDLING AND TRANSPORTING PALLETIZED CARGO

Eugene J. Schwartz, Chicago, Ill., assignor to Kraft Foods Company, Chicago, Ill., a corporation of Delaware Application August 29, 1950, Serial No. 182,028

7 Claims. (Cl. 214—83.24)

This invention relates to cargo carrying bodies for palletized shipments and a method of handling such shipments or distributing goods.

The employment of pallets for handling a large number of packages as a single unit, in warehouses, and for some shipping purposes, has become fairly common. According to the present invention transport vehicles are especially equipped to facilitate handling of loaded pallets and the equipment presently to be described gives rise to an improvement in the method of handling shipments or distributing goods, for example, in reference to the distribution of small lots of merchandise by truck to a number of different customers located at separated points along the truck route.

The main object of the invention is to provide a method of, and apparatus for, facilitating movement of loaded pallets into any type of transportation vehicle; to provide an arrangement whereby loaded pallets may be quickly and easily moved from the interior of the body of the vehicle to a loading opening therein to facilitate access to the merchandise on the pallets; and to provide a method of merchandise or material handling and apparatus therefor, whereby it is unnecessary to climb into the interior of the body and to move manually merchandise from within the body to the loading opening to make it accessible for removal for delivery to some other place.

In general, it is the object of the invention to provide an improved arrangement of merchandise or material handling in connection with the delivery of the merchandise by automobile truck, cargo plane, railroad freight car or other transport vehicles, from one place to another, whereby delivery of merchandise is substantially speeded up, making possible a greater number of deliveries within a given time, and the cost of furnishing delivery service reduced.

Other objects and advantages of the invention will be understood by reference to the following specification and accompanying drawings wherein there is illustrated a selected form of automobile truck equipment and a selected form of cargo plane equipment according to my invention.

Figures 4, 5, 6, 7:
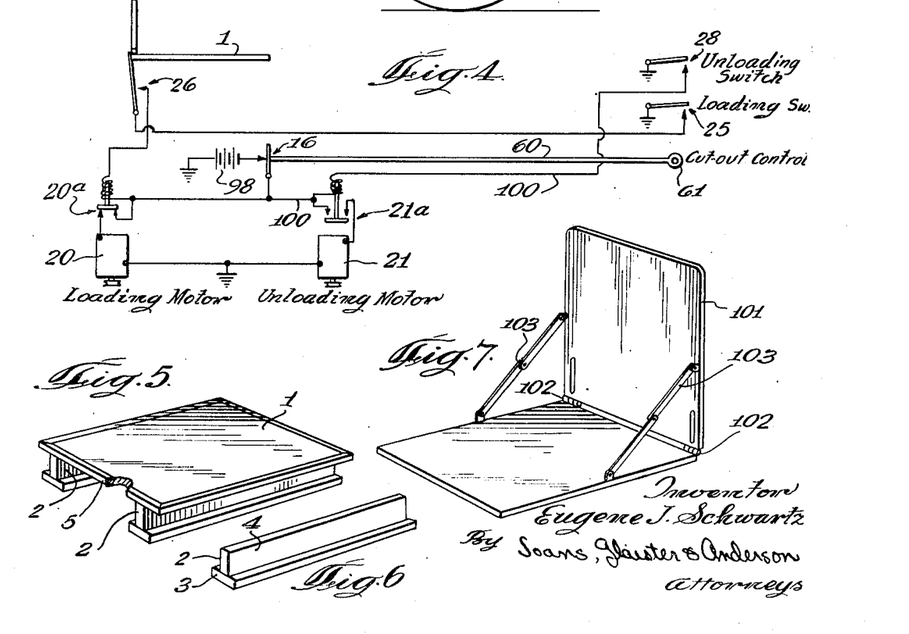
Fig. 4 is an electrical wiring diagram.
Figs. 5, 6 and 7 are perspective illustrations of pallet equipment employed in carrying out my invention.

For the purpose of the present invention, simple, flat pallets 1 (Fig. 5) are employed, these pallets being supported in upwardly spaced relation from a floor by means of two or more supports 2. As shown in Fig. 6, the supports may conveniently be of inverted T-shaped formation embodying a horizontal base plate 3 and a riser 4 rigidly secured to a longitudinally extending central portion of the base and extending upwardly therefrom. These supports are made high enough to support pallets at an elevation from the floor which will permit the lifting fork of a conventional lifting truck to be moved under the pallet and thereafter elevated to pick up the pallet and any merchandise loaded thereon. The pallet 1 may be of any suitable construction and material, for example, plywood or any other structurally rigid form, and it may advantageously have its periphery protected and reinforced by a channel iron frame 5.

In a warehouse, storeroom or other place where merchandise or goods are to be loaded on the pallet 1, the pallet will initially be positioned on a pair of supports 2 substantially as illustrated in Fig. 5 and the required stock of goods assembled thereon. In some instances an order of goods destined for a single customer or other recipient will occupy the entire pallet. In other instances two or more orders respectively destined for different recipients may be assembled on a single pallet. In that case, the order destined for the recipient whose location is first reached along the route of the delivery truck should be assembled at one end of the pallet and the other orders assembled progressively toward the opposite end of the pallet in direct relation to the order in which the respective recipients are reached by the truck on its delivery route.

According to one form of the present invention, an automobile truck body is equipped to receive a number of pallets in end-to-end relation, the pallets being aligned in a row so that when the goods on the pallet at the outer or rear end of the row has been removed and delivered, the emptied pallet may be removed and the others advanced successively into the position of the emptied pallet, the loaded pallets being thereby successively brought to a position whereby they may be advantageously unloaded by the delivery man without climbing up into the truck body in order to reach goods to be delivered.

Figure 3:
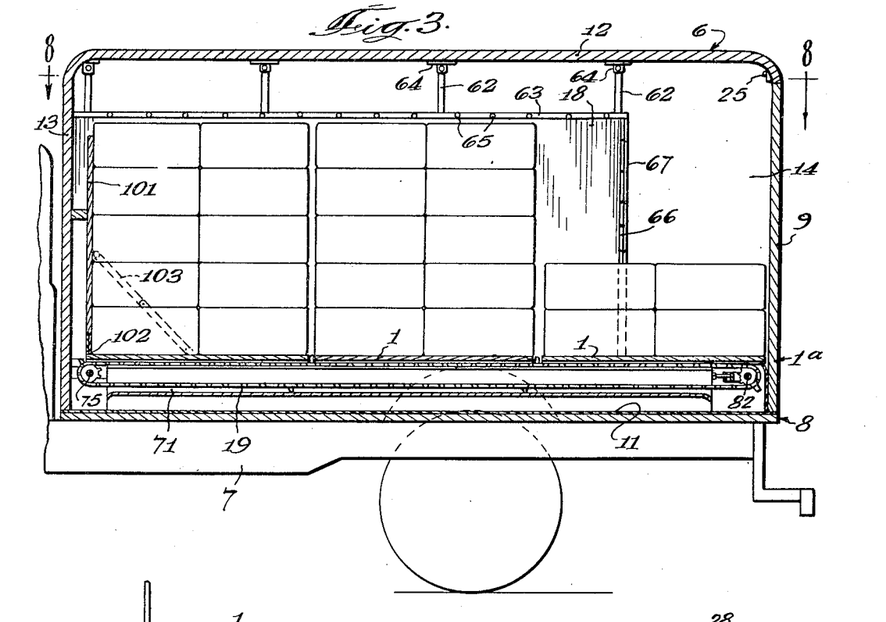
Fig. 3 is a longitudinal section on the line 3—3 of Figs. 1 and 8.
Figure 8:
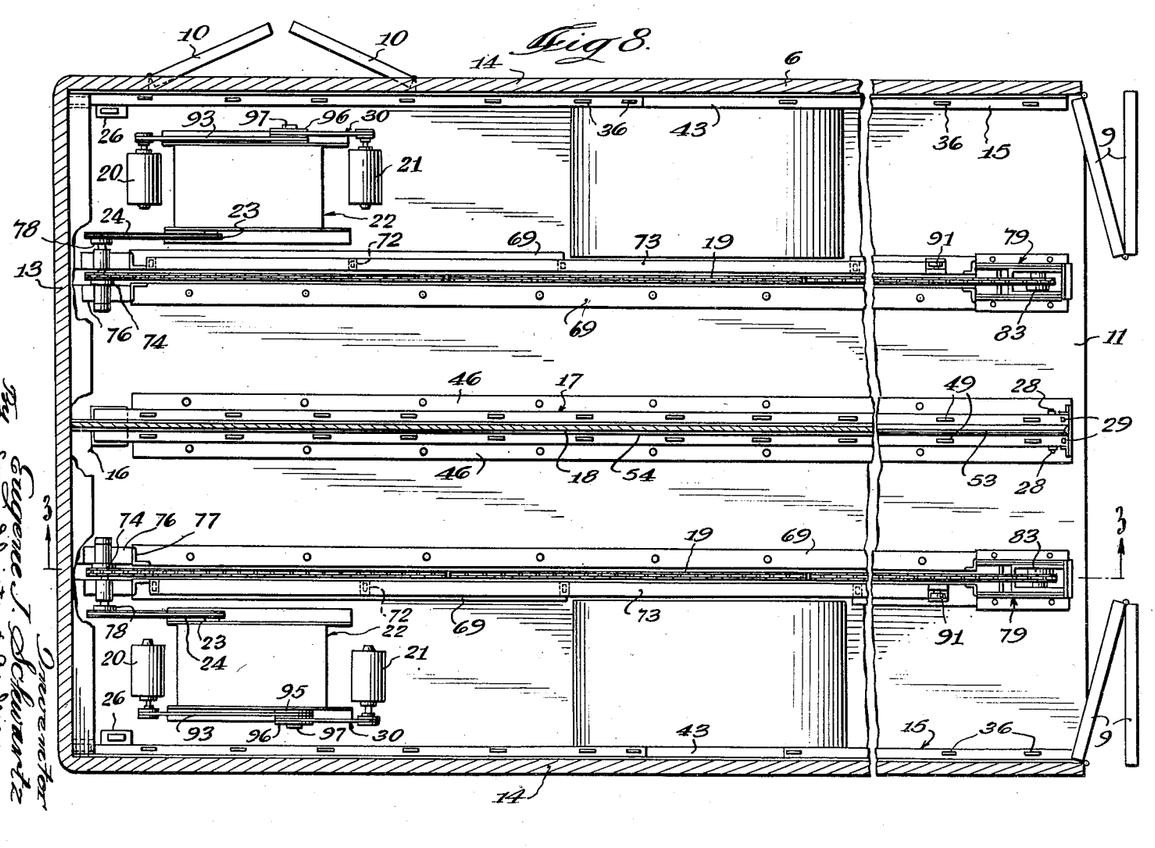
Fig. 8 is a plan section on the line 8—8 of Fig. 3.

For the purpose of handling pallets of the type described, a truck body 6 (Figs. 1 and 3) has its floor equipped with means for portably supporting pallets like the pallet 1. In the illustrated arrangement, the truck body 6 is suitably mounted on the chassis 7 of the truck, the rear end 8 of the truck being provided with suitably hinged doors 9 which may be opened to afford access to the inside of the truck body from the rear end thereof. Also, for a purpose which will presently appear, the truck body may advantageously be provided with one or more doors 10 (Fig. 8) in a side thereof adjacent the front end of the body. The doors 9 may be of a sectional folding type as indicated, or otherwise. The truck body 6 has a floor 11 and a roof 12 and a front wall 13. However, for some purposes, pallet handling equipment about to be described may also be employed in connection with open truck bodies.

Figures 1, 2:
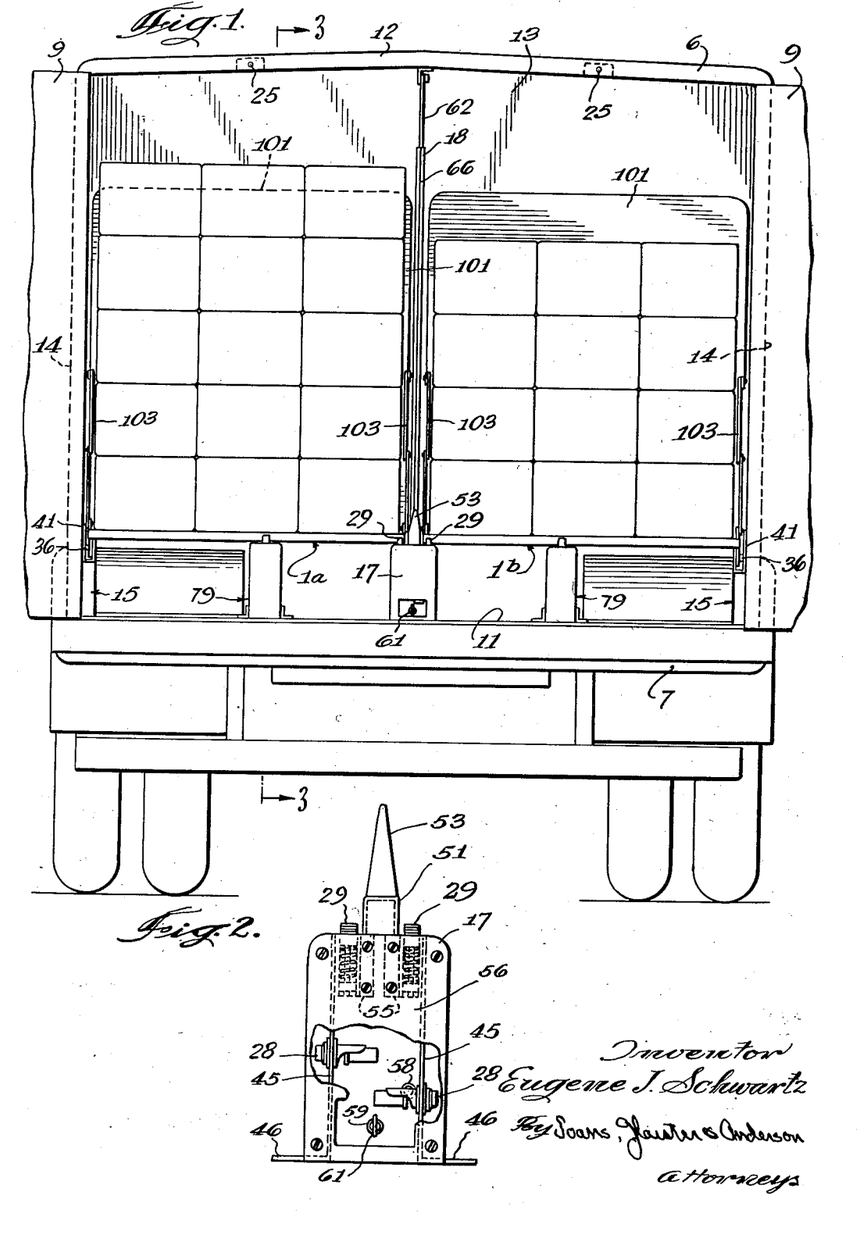
Fig. 1 is a rear end elevation of an automobile truck embodying equipment according to my invention.
Fig. 2 is an enlarged view of a portion of the equipment shown in Fig. 1.

On the floor 11 of the truck body, adjacent each of the side walls 14—14 of the body, there is mounted a side rail or riser 15 (Fig. 1). These rails 15 may be of like construction but in this instance they are shown as being right and left-hand respectively. The rails 15 extend substantially the full length of the truck body from the rear end 8 thereof to the front end 13 thereof and they are rigidly secured in place to the floor and to the respective side walls of the truck body. A double rail 17 is mounted on the floor of the truck body substantially midway between said side rails 15, and extends the entire length of the inside of the body. The central rail 17 is adapted to cooperate with each of the side rails 15 to support two rows of pallets, one row being represented at 1a and the other at 1b. Above the central rail 17 there is preferably provided a partition 18 which divides the truck body into two longitudinally extending compartments, each compartment extending the entire length of the truck body.

In each of the two compartments of the truck body there is provided means for moving the pallets lengthwise along the supporting rails 15 and 17, and this means comprises, in this instance, suitably lugged conveyor chains 19—19, these conveyors being of substantially like construction and disposed approximately midway between the respective side rails 15 and the central rail 17. These conveyor chains are so arranged that upper reaches thereof travel along a path immediately below the pallets in the rows 1a and 1b respectively and so that lugs which project upwardly from the upper reaches of the chains are engageable with the inner and outer ends of the pallets. With this arrangement, when the chain is propelled in one direction, pallets may be moved forwardly in the truck body and when the chain is propelled in the other direction, the pallets may be moved rearwardly in the body.

Two pairs of low voltage electric motors 20 and 21 are respectively associated with suitable geared driving mechanisms 22 for propelling the respective conveyor chains 19. These gear units 22 each have an output shaft and sprocket 23 which, through a chain 24, transmits power to the respective conveyors 19.

The motors 20 and 21 are of a type which operates on electric current furnished by the storage battery of the automobile truck and the motor 20 is arranged to rotate in a direction to effect movement of the upper reach of the respective conveyor chains inwardly or forwardly of the truck body, that is from the rear to the front thereof. The other motor 21 of each pair is arranged to rotate in the opposite direction so as to cause the upper reach of the conveyor chain 19 driven thereby to move rearwardly of the truck body.

The motor and gear box driving mechanisms are respectively located inside of the truck body near the front end thereof on the floor intermediate the outermost supporting rails 15 and the respectively adjacent conveyor structures 19, suitable housings being provided for protecting these driving mechanisms from dirt and injury.

Switches are provided preferably at the rear of the truck body for manual control of the operation of the motors 20 and 21. A pair of push button electric switches 25 may advantageously be located near the roof of the truck on the inside thereof (Fig. 1), one over approximately the middle of each compartment, these switches being suitably connected to the loading motors 20, i. e., the motors which propel the conveyors 19 forwardly when loading loaded pallets into the truck body. These switches are located near the roof of the truck body in this instance for the reason that most loading is effected from a shipping platform which is on about the same horizontal plane as the floor of the truck when backed up to the platform in loading position. Hence, the truckman standing on the loading platform or on the floor of the truck body may conveniently reach the switches 25 to actuate the respective loading motors 20 as desired. The switches 25 are preferably of a type which will open the circuit to the motors when the switch buttons are released so that operation of the motors is maintained only so long as the truckman holds the switch 25 closed.

A limit switch 26 is provided at the forward or inner end of the truck body and is so arranged that it will be opened by a pallet which reaches the front end of the truck body. This limit switch 26 is suitably connected in the circuit of the appropriate switch 25 so that even though the operator maintains the switch 25 closed, the circuit to the motor 20 will be automatically opened when a pallet reaches the predetermined limit of forward movement with its forward end adjacent the front wall of the truck body.

When loading the truck body, a pallet which contains a load of merchandise to be delivered at the last stop of the truck is first loaded into the truck, being deposited on the rails 15 and 17 adjacent the rear end of the truck body. The appropriate conveyor 19 is then actuated to move the loaded pallet forwardly in the truck body to the extent of the length of the pallet whereupon the next loaded pallet is brought into the truck and deposited on the supporting rails 15 and 17 in the position just before vacated by the loaded pallet which was moved one length forwardly into the truck. Thereupon the two loaded pallets are simultaneously moved forwardly into the truck a distance equal to the length of a pallet following which additional loaded pallets are similarly introduced into the truck body and moved forwardly until the supporting rails 15 and 17 are fully loaded. The limit switches 26 serve to prevent excess movement of the last step of forward movement of pallets by the respective conveyors 19.

The motors 21 effect rearward movement of the conveyors as aforesaid and may be called unloading motors. These unloading motors may be controlled by manual switches 28 (see Figs. 2, 9 and 10) which may advantageously be located in a portion of the central rail structure 17 adjacent the rear end of the truck. These switches are of the push button type whereby an electric circuit is kept closed so long as the switch button is pressed in, spring means being provided for effecting opening of the switches when they are released. These switches 28 are located near the floor of the truck in this instance for the reason that they may there be conveniently reached and operated by a delivery man standing on the ground or pavement at the back of the truck. Suitable limit switch means (similar to the limit switches 26) may be provided in association with the electric circuits of the switches 28 and unloading motors 21 to break the electric circuits to said motors 21 when a pallet is moved rearwardly to a predetermined position. However, I prefer to provide more or less positive mechanical stops indicated at 29, also built into the rear end portion of the central rail structure 17. The stops 29 may be of a suitable spring latch form which will permit pallets to be moved edgewise forwardly into the truck over the supporting rails 15 and 17 but which will positively stop outward or rearward movement of the pallets when such pallets come into engagement with the stops.

With a truck body equipped as above described, the body may be loaded with two rows of pallets fully loaded with merchandise to be delivered to various cutomers or recipients at separated points along any selected route of travel of the truck. As already explained, the pallets are individually loaded with merchandise and arranged in the truck body so that at the first delivery stop of the truck, the merchandise to be delivered is available on the pallet at the rear end of the truck. Hence, upon opening the rear end doors of the truck, the delivery man may immediately remove the order or lot of merchandise consigned to the first delivery point and effect delivery thereof without entering the truck body. If the rearmost pallet in one compartment of the truck contains two or more lots to be delivered to different recipients, these lots are, of course, successively delivered.

When the rearmost pallet in one compartment is emptied, that pallet is withdrawn from the rear end of the truck body, this being readily done by the delivery man, the pallets being of sufficiently light weight to be easily handled by one man. Well-constructed pallets of the simple, legless, flat, reinforced edge construction previously described, when made of suitable plywood, will weigh in the neighborhood of 25 or 26 pounds so that they offer no problem in respect of their removal from the rear end of the truck. When the emptied pallet is removed from the end of its compartment, the unloading motor for that compartment is energized by closing the appropriate switch 28 thereby causing the remaining loaded pallets to move rearwardly to bring the next loaded pallet into desirable position adjacent the rear end of the truck. The operator should release the switch 28 as soon as the loaded pallet reaches its delivery position where it is positively stopped by the stop 29 even though the attendant should fail to promptly release the switch 28. It may be observed that the motor drives for the conveyor chains are not sufficiently powerful to force the pallets past the stops 29, and also that if excessive force is put on the unloading motor, slippage will occur in the belt transmission indicated at 30 (Fig. 8) between the unloading motor 21 and the input shaft and pulley of the gear box 22.

After the pallets have been moved rearwardly one length as indicated, the emptied pallet may be returned into the truck body through the side doors 10 adjacent the front end of the truck body. In the event that the first deliveries of merchandise are made from a pallet in the compartment on the other side of the partition from the side to which the doors 10 lead, the emptied pallet may remain in that compartment until the rearmost pallet in the compartment with which the doors 10 communicate has been emptied and loaded pallet movement effected as aforesaid; then emptied pallets may be piled one on top of the other in the forward end portion of the truck body in the one compartment. These emptied pallets will, of course, move rearwardly with the remaining loaded pallets so that it is ordinarily not necessary to pile more than two or three pallets on one conveyor station in the compartment having the access doors 10. Also, it should be observed that loading of the truck should be so arranged that as the truck progresses along its route, the entire remaining load, i. e., the load in both compartments will be gradually shifted to the rear of the truck body in a nearly uniform manner so as to maintain proper balance in the truck. This is, of course, not essential but is desirable as a practical operating procedure.

The details of construction of the rails 15 and 17 and of the conveyors 19 may vary considerably. One satisfactory form of construction of the side rails 15 comprises a metal structure embodying a plurality of supporting posts 31 (Figs. 12 and 16 to 18) which may be of tubular metal construction suitably welded at their lower ends to a base plate or strap 32 in predetermined spaced relationship. These posts 31 are further interconnected by means of a metal side plate 33 which may be attached to the posts by screws or welding as preferred. The side plate 33 extends upwardly above the upper ends 34 of the posts 31 for a short distance as shown so that the upper ends of the posts constitute, in effect, recessed seats with reference to the upper edge of said side plate 33. J-shaped channel members 35 are seated on the upper ends of the posts 34 and against the upwardly projecting portion of the side plate 33, the member 35 being suitably welded or otherwise secured to the posts 31 and plate 33.

A plurality of rollers 36 are rotatably supported by axle bolts 37 which pass through openings in the leg 38 of said member 35 and a reinforcing plate 39 for said leg, through said rollers 36, and into tapped openings in a bar 40 which is welded or otherwise suitably secured to the longer leg 41 of said J-shaped member. The upper portion of the leg 41 of the J-shaped member is provided with suitable openings for receiving screws driven through said openings into the adjacent side wall of the truck body to thereby fasten the upper portion of the rail structure in fixed position in the truck body. The bottom plate 32 of the side rail structure may also be provided with openings for the passage of bolts therethrough and through the floor of the truck body for additionally fastening the rail structure in place.

In many truck bodies there is a wheel-well which projects upwardly into the inside of the body. To accommodate such a wheel-well, the side plate 33 and post 31 are cut out and/or omitted as indicated at 42 (Fig. 12), this cut-out portion being preferably formed to snugly fit the wheel-well. In the event that the provision of the recess for receiving the wheel-well extends into the area normally occupied by a roller 36, a slide plate 43 may be welded to the legs 38 and 41 of the J-shaped member to bridge whatever space is left between roller supporting portions of the structure. This slide plate 43 should, of course, be so positioned that its upper surface is substantially in the plane of the tops of the rollers 36.

At the forward end of the rail structure, an angle iron member 44 (Figs. 12 and 17) may be welded to the opposite legs of the J-shaped member and the reinforcing plate 39 to strengthen the end portion of the structure.

Figures 9, 10, 11:
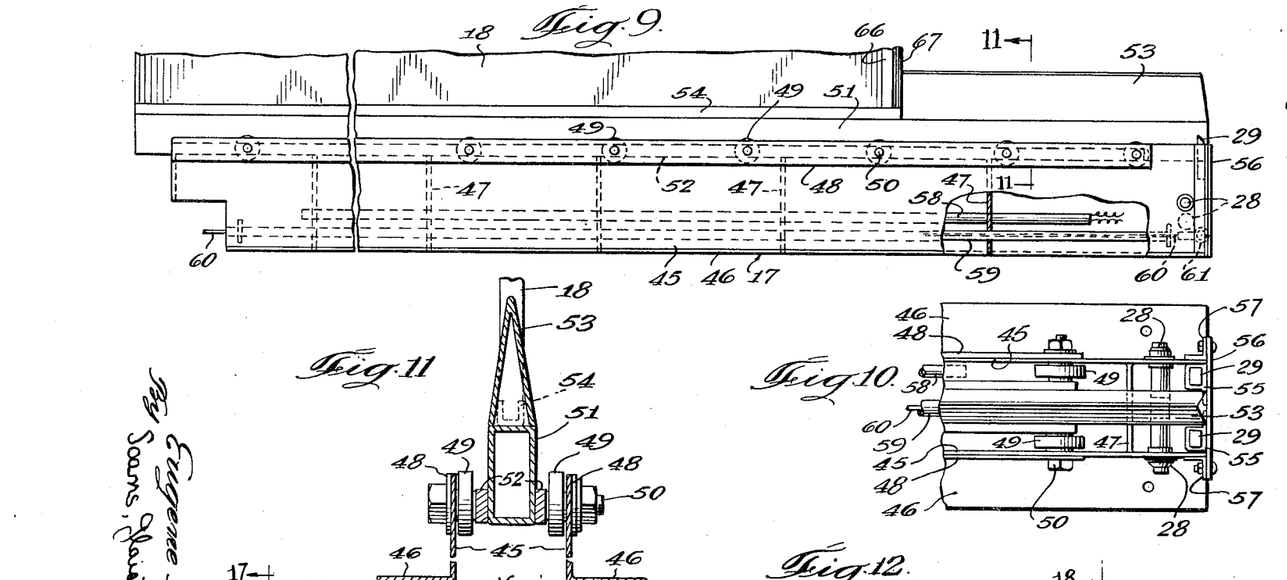
Fig. 9 is a side elevation of a part of the truck equipment.
Fig. 10 is a plan of a portion of Fig. 9.
Fig. 11 is a cross section on the line 11—11 of Fig. 9.
Figure 12:
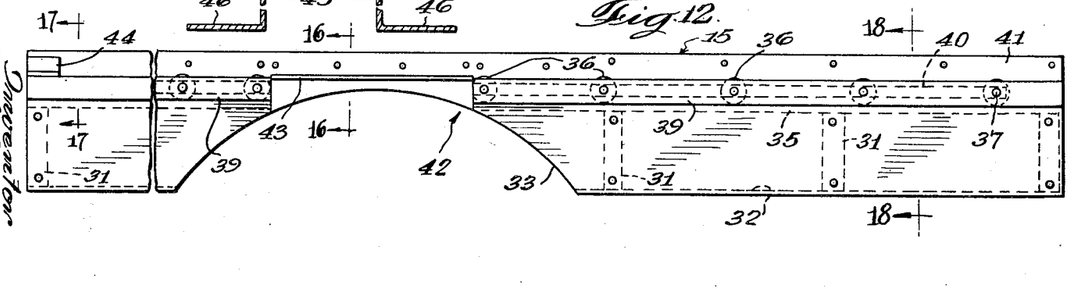
Fig. 12 is a side elevation of another part of the truck equipment.

The central or double supporting rail 17 may embody details of construction as represented in Figs. 9, 10 and 11. As there shown, the main body of the rail consists of a pair of upstanding side plates 45—45 having bottom flanges 46 which are adapted to be seated on the floor of the truck and bolted thereto. These side plates 45 are rigidly interconnected by means of a plurality of cross-plates 47 which are welded to the respective side plates so as to form a very rigid structure. The upper margins of the side plates 45 are reinforced by strap members 48 which are spot welded or otherwise rigidly secured to the plates 45 as shown.

Pairs of rollers 49 located at suitable intervals along the length of the rail structure are supported on bolts 50 which pass through the reinforced upper portions of the side plates. These bolts 50 also support an upwardly extending centrally located tubular rail element 51 which has its lower margin reinforced by means of suitable metal bar members 52 which are preferably welded to the tube 51 in the position shown. The upwardly projecting rail portion 51 constitutes a divider strip which prevents the pallets in one section of the truck body from coming into engagement with those in the other section.

To facilitate placing of the loaded pallets on the guide rails in the respective sections of the truck, the rearward end portion of the central rail 17 is provided with an upwardly projecting wedge-shaped member 53 which will serve to guide the pallet to a position clear of the rail portion 51 as an incident to the downward movement of the pallet when it is being delivered to the truck body. This guide member 53 may conveniently be around one-third to one-half the length of a pallet so that it will readily guide the pallet as aforesaid. Forwardly of the guide member 53, there is provided an upwardly facing U-shaped member 54 which is adapted to receive the lower marginal portion of the central partition 18 to support said partition at its lower edge.

The aforementioned rear end stops 29 may be mounted in suitable housings indicated at 55 which are attached to a rear end plate 56 which is, in turn, rigidly secured to the rear end portions of the side plates 45 through the agency of angle irons 57. The end plate 56 and one flange of each of the angle irons 57 project laterally from the outer faces of the side plates 45 and serve to protect the operating buttons of the switches 28 which are located between said side plates 45 and respectively fastened thereto.

Electric conductors are carried from the switches 28 to the loading motors through a suitable conductor 58 which extends along the length of the central rail structure through suitable openings provided in the cross-plates 47. Another pipe or conduit 59 is similarly supported within the central rail structure and this pipe 59 serves to guide a rod 60 which is provided for controlling a cut out switch 16 (Figs. 4 and 8) located at the front end of the truck body for breaking the electrical connection to the conveyor operating motors in an emergency or when the rear doors 8 of the truck are left open and the truck momentarily left unattended. By moving the rod lengthwise, the switch 16 may be opened and closed. The rear end of the rod 60 is provided with a clevis or other suitable end element 61 to facilitate manipulation thereof and said end element is normally housed within said central rail structure as shown in Fig. 9 and thereby protected.

The central partition 18 may advantageously be of suitable plywood construction supported in the top channel 54 of the central rail as already explained, and suspended from the roof of the truck body by means of hangers 62 (Figs. 1 and 3) secured to the panel by means of a metal channel member 63 to which the hangers are welded. These hangers may be of rectangular tubing and their upper ends may be bolted to suitable brackets 64 which are fastened to the top of the truck body. The channel 63 embraces the upper marginal portion of the panel and may be secured thereto by a plurality of screws 65 passing through both legs of the channel and through the intervening marginal portion of the panel. The rear edge of the panel may be reinforced and protected by a metal channel member 66 having a pointed nose portion 67 to guide the loaded pallets to one side or the other of the partition panel.

Figure 13:
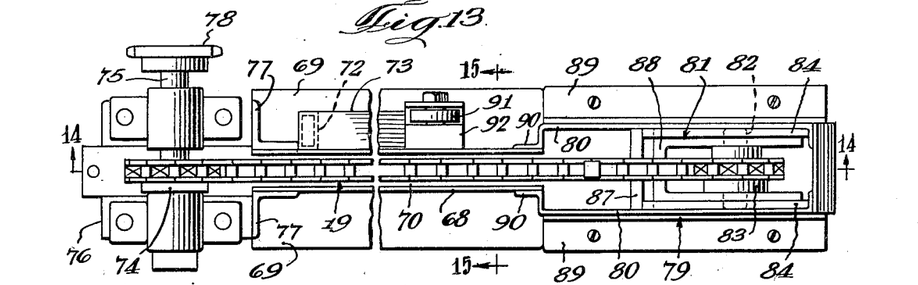
Figs. 13 and 14 are plan and vertical sectional views respectively of still another part of the truck equipment, the plane of the section of Fig. 14 being indicated by the line 14—14 of Fig. 13.
Figure 14:
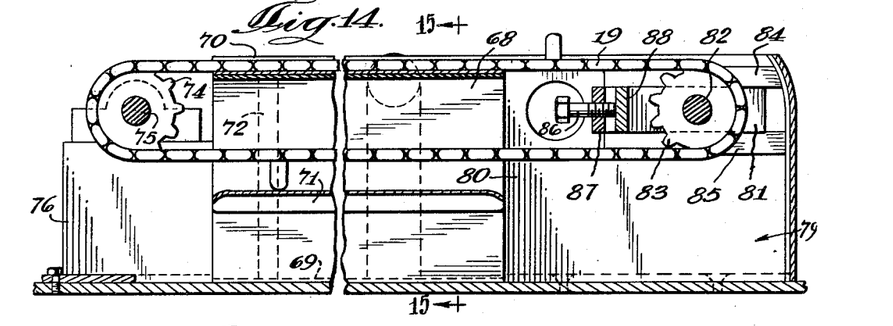
Figures 15, 16:
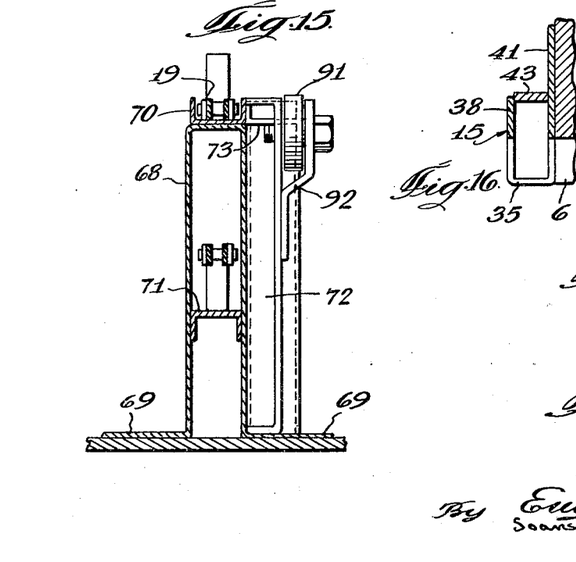
Fig. 15 is a cross section on the lines 15—15 of Figs. 13 and 14.
Figs. 16, 17 and 18 are sections on correspondingly numbered lines of Fig. 12.
Figures 17, 18:
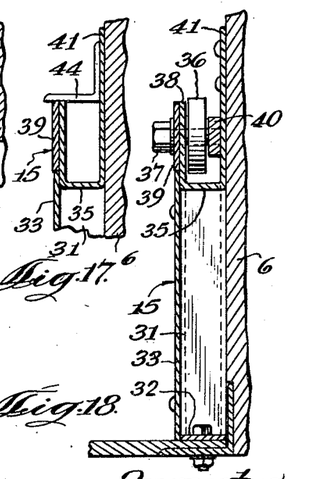

Each of the two chain conveyors comprises in this instance, a supporting housing structure consisting of an inverted U-shaped housing 68 (see Figs. 13, 14 and 15) of sheet metal construction, this housing being provided with laterally outwardly extending legs 69 at its lower end by means of which the housing may be seated on and bolted to the floor of the truck body. Portions of the housing 68 may be cut away to fit the wheel well of the truck body if necessary. At the top of this housing there is provided an upwardly facing channel or U-shaped chain guide trough 70 which is welded or otherwise suitably secured to said member 68. Another chain guide 71 is located within the member 68 to guide the lower reach of the chain while the member 70 guides the upper reach of the chain. For reinforcing this chain guide structure, a series of rectangular posts 72 (see also Fig. 8) are welded to one of the sides of the member 68 and its bottom flange, and a horizontally extending rectangular metal tube 73 is welded to the tops of said posts 72 and to the adjacent side wall of the upper chain guide trough 70.

At the forward end of the chain guide there is provided a sprocket 74 carried by a shaft which is journaled in bearings carried by a suitable supporting structure 76 which is bolted or welded or otherwise secured to the adjacent end portion of the chain guide member 68, angle iron members 77 being advantageously employed for making the connection between the sprocket supporting structure 76 and said chain guide. At one end, the shaft 75 is provided with a sprocket 78 which receives the driving chain 24 previously referred to.

At the other or rear end of the chain guide structure there is provided an arrangement for adjusting the tautness of the chain. This arrangement comprises a suitable housing structure 79 embodying side plates 80—80 between which a clevis 81 is forwardly and rearwardly longitudinally slidably mounted. The arms of the clevis 81 support a shaft 82 on which is journaled a sprocket 83 which cooperates with the drive sprocket 74 to movably support the conveyor chain which is indicated at 19. The clevis 81 is guided between upper and lower guide members 84 and 85 which are secured to each of the side plates 80. For controlling the position of the sprocket, an adjusting screw 86 is threaded through a cross-bar 87 which is welded in place between the side plates 80—80 in horizontal alignment with the front end bar portion 88 of the clevis 81. Suitable access openings may be provided in the side plates 80 for access to the adjusting screw 86, and angle iron mounting members 89 are welded to the lower marginal portions of the side plates 80 for facilitating attachment of the chain tightening unit to the floor of the truck body. Suitable brackets or flanges 90 are provided on the front end portions of the housing side plates 80 to facilitate attachment of the same to the side walls of the chain guide structure 68 by welding or otherwise. The rear end of the housing structure 79 may be closed by suitable closure plate but the top remains open to permit the chain to enter and travel through the housing in its movement about the sprocket 83.

To protect the rear end of the rail member 73 from possible damage when the loaded pallets are delivered into the truck body, a roller 91 is supported by suitable bracket structure 92 adjacent said rear end of the member 73. This roller will serve to guide any depending portion of the pallet upwardly over the surface of the member 73.

The power units for the respective conveyor chains 19 comprise the oppositely rotating loading and unloading motors 20 and 21 which are connected by means of driving belts 93 and 39 respectively to pulleys 95 and 96 on the input shaft 97 of the gear box 22. Through suitable speed reduction gearing within the gear box, the sprocket 23 on the output shaft of the gear box is driven at a relatively slow speed but with ample power to drive the conveyor to which the unit is connected through the chain drive 24 as already described. The motors 20 and 21 are preferably started by means of solenoid switches indicated at 20a and 21a respectively (Fig. 4), these motors being connected to a source of power and to control switches as shown in the wiring diagram Fig. 4. As shown in the wiring diagram, the prime source of power may be considered as the battery 98 of the automobile truck, one side of the battery being grounded as usual. The lead from the other side of the battery is connected to the main cutout switch 16 which may be opened through the agency of the control rod 60 as already explained. This switch 16 and the limit switch 26 being normally closed, and the loading switch 25 being manually closed, electric power will flow through the solenoid coil of the starting switch 20a of the loading motor to thereby close the starting switch 20a so as to actuate the loading motor. When the switch 28 for the unloading motor is closed, the solenoid coil of the starting switch 21a will be energized and cause the switch 21a to complete a circuit through the line 100 leading from the cutout switch 16 directly to the unloading motor 21, the other side of which is grounded.

The solenoid coil of the starting switch 20a of the loading motor 20 is connected through the limit switch 26 to the loading switch push button 28, current being derived from the battery through the cutout switch 16 which is connected to one side of the coil 20a as indicated. In the event that a pallet 1 has advanced in the truck body to the limit of its forward movement, the switch 26 is opened as indicated in the diagram so that further forward movement cannot ordinarily be effected. This limit switch 26 does not, however, affect the circuit of the unloading motor switch 28.

The loaded pallet which is first introduced into each compartment of the truck body, is preferably equipped with a back board or stop wall 101 (Figs. 1, 3 and 7) which is hingedly connected as indicated at 102 to the front edge of the pallet. Folding braces 103 are also employed to connect the wall 101 to the pallet and to limit the unfolding movement of the wall 101 to a substantially vertical position relative to the pallet. The folding braces 103 and hinges permit the back wall 101 to be folded to a flat position on the panel 1 when desired for purposes of handling the empty pallet. This back board 101 provided on the innermost pallets, serves to support the load of merchandise on the pallet against shifting forwardly under forward momentum when the truck is brought to a stop. Similar back or end walls may, of course, be employed in connection with each of the pallets but this is usually not necessary since the load on one pallet may be so arranged to support the load on the next adjacent rearwardly disposed pallet. Hence, the provision of a back wall on the pallets is usually desirable only on the pallets which will be disposed adjacent the front end of the truck body when fully loaded and which, during the course of delivering the load, will be moved rearwardly from the front end wall of the truck body.

In another embodiment of the present invention, an airplane fuselage is equipped to receive a number of pallets in end-to-end relation so that when a pallet at the outer or front end of the row has been removed and delivered, the others can be successively advanced into the position formerly occupied by the pallet removed whereby they may be advantageously unloaded by the delivery man without climbing up into the fuselage to reach the goods to be delivered.

Figures 19, 20:
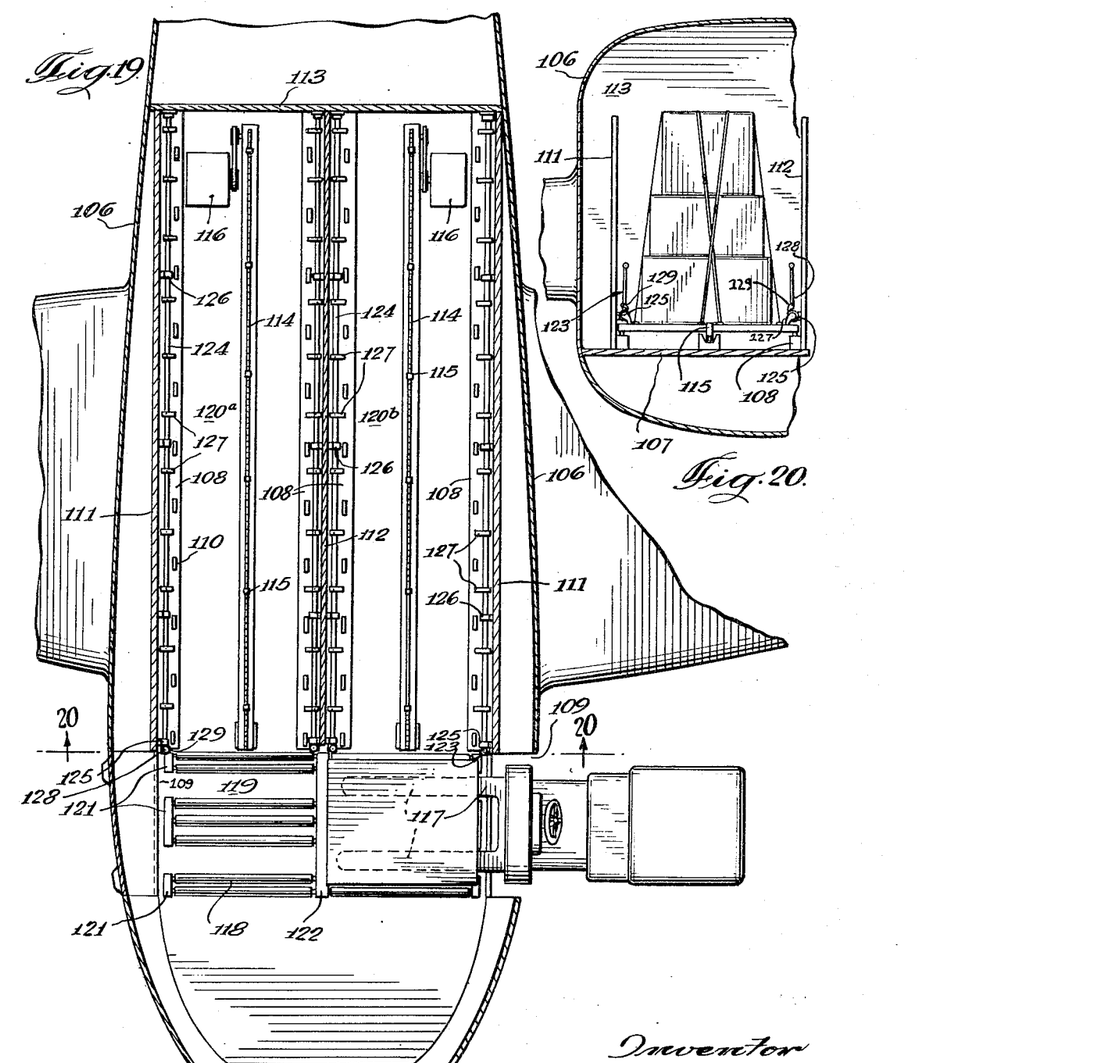
Fig. 19 is a fragmentary plan view, partially in section, of the fuselage of an airplane embodying equipment according to my invention.
Fig. 20 is a partial sectional view on the line 20—20 of Fig. 19.

For the purpose of handling the pallets as described, an airplane fuselage 106 has its floor 107 equipped with means for portably supporting pallets like the pallet 1 (Figs. 19 and 20). For this purpose rails 108 are mounted on the floor and extend from a point adjacent the door opening 109 to a rear portion of the fuselage. A plurality of rollers 110 are rotatably supported at spaced intervals on the rails 108 with a portion of the rollers 110 extending above the plane of the rails 108. To keep the pallets 1 constrained in a row side walls 111, center wall 112 and rear wall 113 are provided. The walls 111, 112, and 113 form two longitudinally extending compartments 120a and 120b, each compartment extending through the greater part of the fuselage.

In each of the two compartments there is provided means for moving the pallets lengthwise along the supporting rails 108. This means comprises a conveyor chain 114 provided with suitably spaced upwardly extending lugs 115. The conveyors are disposed midway between the side rails 108 of each compartment. The conveyor chains 114 are so arranged that the upper reaches thereof travel along a path immediately below the pallets and so that the lugs 115 which project upwardly from the upper reaches of the chains are engageable with the forward and rearward ends of the pallets. With this arrangement, when the chain 114 is propelled in one direction, pallets may be moved forwardly in the fuselage body and when the chain is propelled in the other direction, the pallets may be moved rearwardly in the body.

A motor and gear box driving mechanism 116 is provided for operating each of the conveyor chains and is located near the rear of the fuselage below the floor 107 and intermediate the outermost supporting rails 108 and the respectively adjacent conveyor chains 114. Suitable housings are provided for protecting these mechanisms from dirt and injury.

The motors may be of a type which operate on electric current supplied by the airplane. Suitable switches (not shown) near the entrance to the fuselage are provided for manual control of the operation of the motors. Appropriate limit switches similar to those described for use in a truck body may be provided for limiting the forward and rear movement of the pallets.

Sets of parallel rollers 118 located forward of each of the compartments 120a and 120b, are journaled in rails 121 and 122 which are mounted on the floor and set parallel to the rails 108. The rollers 118 extend for substantially the width of each compartment and are so journaled that the tops of the rollers 118 are in the plane of the tops of the rollers 110. The rail 122 extends for a reasonable distance above the tops of the rollers 118 to provide a stop for the pallets being loaded into the plane. Two channels 119 extending from the fuselage doors to the center rail 122 are formed forward of each compartment by removing sections of the floor 107. The channels 119 are parallel to and located between the rollers 118. These channels provide space for the forks 117 of a lift truck to enter the fuselage compartment and deposit a pallet on the rollers 118.

In operation the loaded pallets are placed on the rollers 118 by means of a lift truck. The pallets may then be manually pushed so as to enter the compartments 120a or 120b. The appropriate conveyor 114 is then actuated to handle the movement of the pallets in a similar manner as described for a truck body. In unloading, the conveyors 114 will deposit the pallets on the rollers in front of the fuselage doors for easy removal.

Loads are tied in a conventional manner to the pallets before they are placed in the plane. After the pallets are all located in an end-to-end relationship in the fuselage they are constrained from further movement during flight by use of a locking device 123.

The locking devices 123 (illustrated in Figs. 19 and 20) include shafts 124, extending lengthwise adjacent and parallel to walls 111 and 112. The shafts 124 are journaled in the end wall 113 and in bearings 126 attached rigidly to walls 111 and 112. A fixedly positioned ratchet wheel 125 is journalled on the end of each of the shafts 124 which is adjacent the opening 109 and the forward ends of the shafts 124 extend through the ratchet wheels 125 and are rigidly connected to handles 128. Pawls 129 which are pivotally connected to handles 128 have releasable interlocking connections with ratchets 125. At spaced intervals along the shafts 124 there are rigidly attached arms 127 which rotate with shafts 124.

Prior to setting the loaded pallets in the plane the pawls 129 are released and the handles 128 turned so as to swing the arms 127 to an upward extending position. The pallets with securely fastened loads are then set in the plane. With the pawls 129 in locking relation to ratchets 125 the handles 128 are rotated until the arms 127 are set rigidly against the pallets 1 preventing them from moving in the vertical direction, the lugs 115 preventing movement in the longitudinal direction, thus preventing movement of the pallets in any direction. The described locking device provides a unique and simple method of retaining loads in a fixed and rigid position during flight.

The conveyor system which has been described is particularly adjusted for efficient operation in an airplane. The airplane may be trimmed by moving the center of gravity of the load to the desired point after each portion of the cargo has been discharged and the ease of loading and the readily releasable means for locking the loaded pallets to prevent fore and aft and up and down movement of the load makes possible fast and efficient delivery of air freight.

In a similar manner the conveyor system may be adopted for use in railroad freight cars, or any other type of cargo vehicle.

The present invention is a continuation-in-part of my prior application Serial No. 144,286, which was filed on February 15, 1950 (now abandoned), and which is assigned to the assignee of the present invention.

Many changes may be made in the details of the described apparatus while nevertheless facilitating the handling of palletized shipments according to the principles herein described.

I claim:

1. A vehicle having an opening through which loaded pallets may be moved into or out of the vehicle, a pair of relatively spaced tracks on the floor of said vehicle for supporting loaded pallets for movement in the vehicle toward and from said opening, an endless conveyor chain in said vehicle having a series of uniformly spaced-apart lugs which extend upwardly from the upper reach of the conveyor chain for separately engaging a plurality of pallets on said tracks and operative to propel such pallets along said tracks as aforesaid, drive means for said conveyor, an electrical control circuit for said drive means, said control circuit including a limit switch disposed at one end of said vehicle and extending in the path of movement of the pallets carried by said conveyor chain, whereby engagement of the pallet with said limit switch opens the control circuit to stop said conveyor.

2. A cargo carrying vehicle body having an opening through which loaded pallets may be moved into and out of said body, a pair of tracks on the floor of said body for supporting a plurality of pallets disposed in end to end relationship for movement in said body toward and from said opening, locking means cooperating with said pallets to constrain movement of said pallets in the vertical direction, said locking means comprising a rotatable member disposed in adjacent parallel relation to each of said tracks, a series of spaced apart arms fixed to each of said rotatable members, and means for rotating each of said rotatable members to position said arms in overlying engagement with pallets supported on said tracks, an endless conveyor chain in said vehicle having a series of uniformly spaced-apart lugs which extend upwardly from the upper reach of the conveyor chain for separately engaging a plurality of pallets on said tracks and operative to propel such pallets along said tracks as aforesaid, and power means for actuating said conveyor.

3. A cargo carrying vehicle body having a side opening through which loaded pallets may be moved into and out of said body onto a first conveyor, channels in said first conveyor to permit the forks of a lift truck to place a pallet on said first conveyor, a second conveyor including a pair of tracks on the floor of said body for supporting a plurality of pallets disposed in end to end relationship for movement in said body toward and from said side opening, locking means cooperating with said pallets to constrain movement of said pallets in the vertical direction, said locking means comprising a rotatable member disposed in adjacent parallel relation to each of said tracks, a series of spaced apart arms fixed to each of said rotatable members, and means for rotating said rotatable members to position said arms in overlying engagement with the pallets on said tracks, and means carried by said body for propelling loaded pallets selectively inwardly or outwardly of the vehicle body along said tracks.

4. A vehicle body having an opening through which loaded pallets may be moved into and out of the vehicle body, a sliding support for the loaded pallets comprising a first and a second pair of tracks disposed in generally parallel relation to each other and extending from said opening into said body, the adjoining tracks of said first and second pair being disposed in closely spaced relation and including means for guiding the movement of the loaded pallets on to a selected one of the pair of tracks, said means comprising an elongated member positioned between said adjoining tracks and extending along a portion thereof adjacent said vehicle body opening, said elongated member having the oppositely facing side surfaces thereof projecting above said tracks in converging relation to each other, whereby a pair of slanting surfaces are provided to direct downwardly moving pallets being loaded into the vehicle body into alignment with the selected pair of tracks.

5. A vehicle body having an opening through which loaded pallets may be moved into and out of said vehicle body, a first and a second set of longitudinally extending tracks on the floor of said vehicle body, said sets of tracks being disposed in generally parallel relation to each other and extending from said opening into said vehicle body, a partition wall positioned between and extending along the major portion of the length of said tracks, the end portion of said partition wall adjacent said vehicle body opening having a reduced height and sloping side walls for guiding the movement of pallets being loaded into said body onto a selected one of the sets of tracks.

6. A palletized cargo vehicle body having a front end wall and a rear opening through which loaded pallets may be moved into and out of said body, a door for closing said opening, tracks in said body extending from said opening to said front end for supporting pallets for movement in said body toward and from said front end, an endless conveyor chain in said body having a series of uniformly spaced lugs which extend upwardly from the upper reach of the conveyor chain for separately engaging pallets on said tracks and operative to propel such pallets along said tracks, means for driving said conveyor, a pallet supported on said tracks for movement as aforesaid and having an upstanding wall which constitutes, in effect, a false front end wall of the vehicle to impart to the vehicle a variable loading capacity between such wall and said door depending on the position of the pallet relative to said door, and locking means cooperating with said pallet to constrain movement thereof in vertical and horizontal directions relative to said supporting tracks.

7. A palletized cargo vehicle body having a front wall and a rear opening through which palletized loads of merchandise may be moved into and out of said body, tracks in said body extending from said rear opening to said front wall for movably supporting such palletized loads in said body, a set of pallets adapted to be arranged in proximate edge to edge relationship on said tracks and to occupy substantially the entire length of said body for receiving and supporting separate loads of merchandise, the merchandise loads on the respective pallets being operative to support the merchandise loads on the respectively adjacent rearwardly disposed pallets against displacement forwardly of said body from the respective supporting pallets as an incident to the momentum of the loads during slowing and stopping of forward travel of said vehicle body, and a chain conveyor in said body provided with a series of uniformly spaced-apart lugs which extend upwardly from the upper reach of the conveyor chain and separately engage a plurality of said pallets for constraining movement thereof in horizontal directions and simultaneously moving said aligned pallets toward said rear opening for successive removal of the loaded pallets from the rear end of said body, whereby the innermost pallet and the load thereon will be moved into spaced relationship to said front wall, said innermost pallet being provided with a wall member which extends upwardly from innermost edge of the pallet, said pallet wall member being operative to support the load on said pallet against displacement as aforesaid in all positions of said last mentioned pallet.

References Cited in the file of this patent

UNITED STATES PATENTS

| Number | Name | Date |
|---|---|---|
| 380,603 | Steele | Apr. 3, 1888 |
| 541,083 | Flynn | June 18, 1895 |
| 699,475 | Bechtel | May 6, 1902 |
| 1,142,088 | Greene | June 8, 1915 |
| 1,206,169 | Talbot | Nov. 28, 1916 |
| 1,271,413 | Allen | July 2, 1918 |
| 2,138,893 | Wallace | Dec. 6, 1938 |
| 2,282,353 | Fitch | May 12, 1942 |
| 2,334,124 | Peterson | Nov. 9, 1943 |
| 2,442,549 | Pearlman | June 1, 1948 |
| 2,459,045 | Pride | Jan. 11, 1949 |
| 2,471,693 | Lilienfeld | May 31, 1949 |
| 2,517,938 | Stevenson | Aug. 8, 1950 |
| 2,521,727 | Kappen | Sept. 12, 1950 |
| 2,530,341 | Satsky | Nov. 14, 1950 |
| 2,534,057 | Pride | Dec. 12, 1950 |
| 2,543,254 | Osborn | Feb. 27, 1951 |
| 2,626,456 | Harrison | Jan. 27, 1953 |
| 2,635,771 | Black | Apr. 21, 1953 |

FOREIGN PATENTS

| Number | Country | Date |
|---|---|---|
| 499,033 | Germany | May 30, 1930 |